United States Patent
Conti

[11] Patent Number: 5,369,721
[45] Date of Patent: Nov. 29, 1994

[54] FIBER OPTIC BUNDLE WITH REMOVABLE AND REPLACEABLE LIGHT GUIDES

[76] Inventor: Mario W. Conti, 7044 Estrella de Mar Rd., Carlsbad, Calif. 92008

[21] Appl. No.: 2,702

[22] Filed: Jan. 11, 1993

[51] Int. Cl.⁵ .................................. G02B 6/36
[52] U.S. Cl. ........................... 385/115; 385/89; 385/901
[58] Field of Search ............... 385/115, 116, 117, 118, 385/119, 120, 121, 900, 901, 146, 128, 89

[56] References Cited

U.S. PATENT DOCUMENTS

| | | | |
|---|---|---|---|
| 3,455,622 | 7/1969 | Cooper | 385/115 |
| 3,584,779 | 6/1971 | Kessler et al. | 385/115 |
| 4,173,393 | 11/1979 | Maurer | 385/128 |
| 4,759,604 | 7/1988 | Utsumi et al. | 385/116 |
| 4,921,326 | 5/1990 | Wild et al. | 385/117 |
| 4,978,186 | 12/1990 | Mori | 385/115 |

*Primary Examiner*—Rodney B. Bovernick
*Assistant Examiner*—John Ngo
*Attorney, Agent, or Firm*—Edgar W. Averill, Jr.

[57] ABSTRACT

A fiber optic bundle assembly with removable and replaceable light guides. The assembly includes a focused light source and a plurality of light guides held in a light bundle support member. Each receiving end of each light guide is formed in a hexagonal shape with each of the receiving ends being of the same size so that a bundle of receiving ends may be assembled with essentially no air space between adjacent light guides. One or more light guides may be removed and replaced with a hexagonal plug of the same size as the receiving ends.

10 Claims, 2 Drawing Sheets

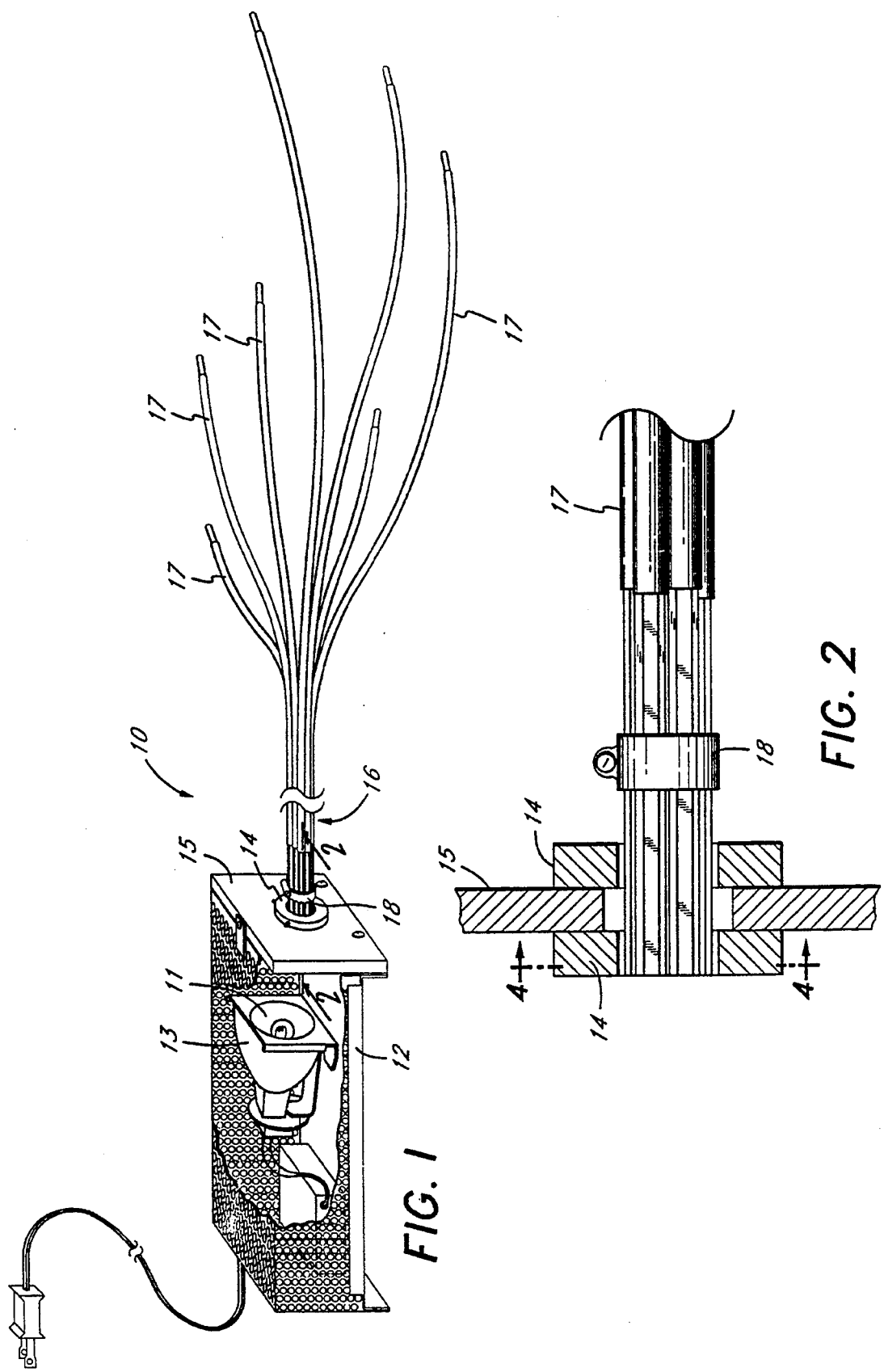

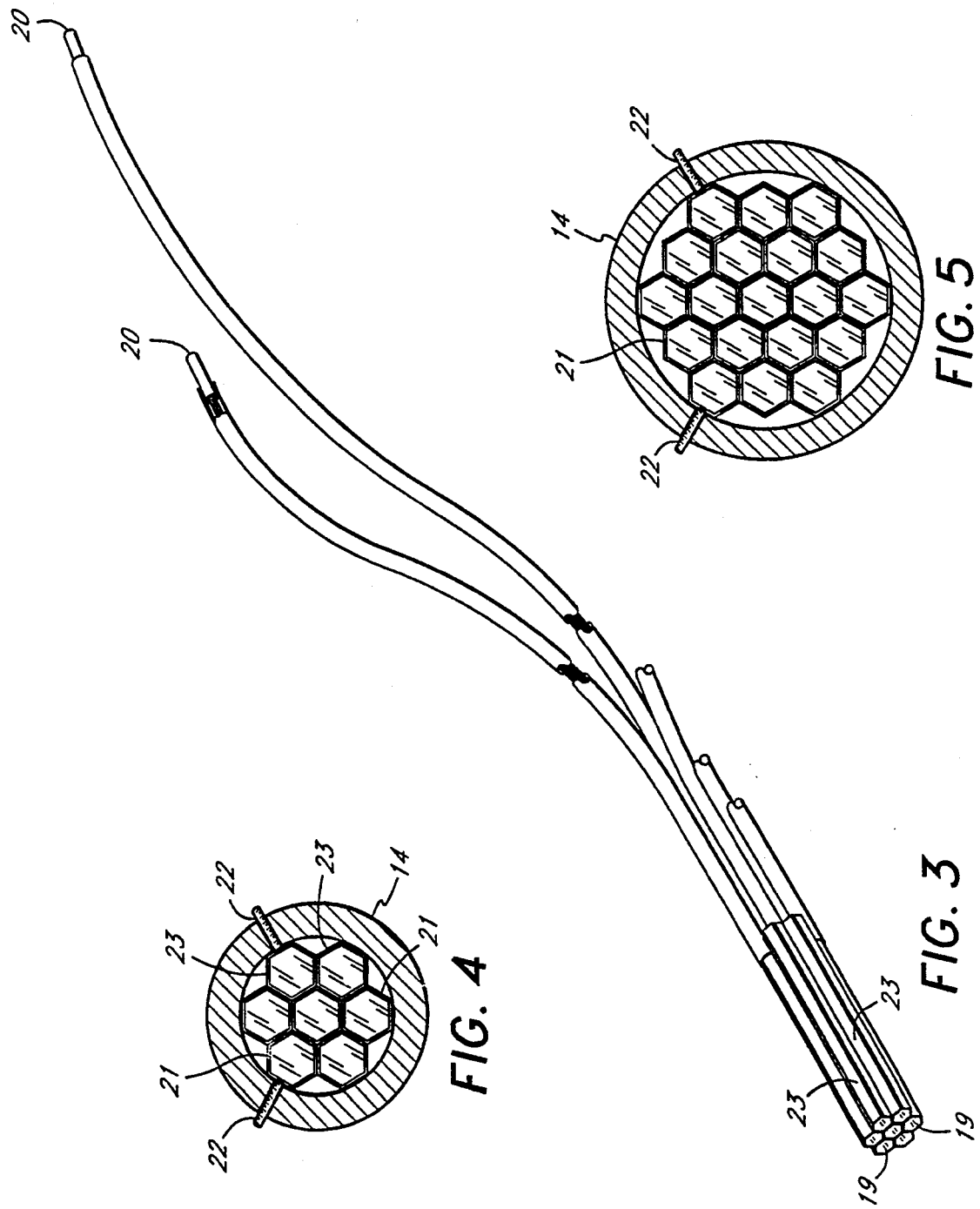

FIBER OPTIC BUNDLE WITH REMOVABLE AND REPLACEABLE LIGHT GUIDES

BACKGROUND OF THE INVENTION

The field of the invention is fiber optics, and the invention relates more particularly to light bundles which include a plurality of light guides.

A device with a plurality of light guides is shown in applicant's U.S. Pat. No. 4,530,036 where a plurality of light guides is shown in FIG. 2 where the light receiving ends are held together by a circular metallic sleeve. The individual light bundles are shown affixed to transparent tubes and used for lighting an art object. Assemblies of the general type shown in applicant's U.S. Pat. No. 4,530,036 are useful for numerous display and other applications where individual beams of light are useful, particularly where the light source should provide a minimum of heat. One such application is in the display of art objects which are degraded by heat and ultraviolet light, both of which are essentially eliminated by a light guide.

One of the shortcomings of the type of bundle shown in the above-referenced patent is that the number of light guides is fixed, and if it is desired to change, for instance, a display and use a lesser or greater number of light bundles, this could not be done efficiently. Furthermore, the light bundles were typically supplied in identical lengths, and many times a particular use will require that there be longer and shorter bundles. Lastly, when light guides have circular light receiving ends which are rigid, there are gaps between adjacent light guides which waste a certain of amount of light which could otherwise be transmitted to the desired location.

SUMMARY OF THE INVENTION

It is an object of the present invention to provide a bundle of light guides which are tightly packed and yet from which individual light guides can be removed and replaced with light guides of a different length or with a plug.

The present invention is for a fiber optic bundle assembly with removable and replaceable light guides. The assembly includes a focused light source held by a frame, and a light bundle support member is also held by the frame. A plurality of light guides is held by the light bundle support member, and each light guide has a light receiving end and a light transmitting end. The light receiving ends of each light guide are fixed in the shape of a hexagon, and the light receiving end of each light guide is fixed in the shape of equally sized hexagons. The light receiving ends are packed together so that the sides of each hexagon abut at least three sides of adjacent hexagons and are held together so that the light receiving ends lie in a single plane. Preferably, the light receiving ends are encased in a rigid hexagonal tube and are supported by a tightenable clamp which may be loosened so that one or more of the light guides can be removed and replaced with the light guide of a different length or with an opaque plug.

BRIEF DESCRIPTION OF THE DRAWINGS

FIG. 1 is a perspective view of the fiber optic bundle assembly of the present invention.

FIG. 2 is an enlarged cross-sectional view taken along line 2—2 of FIG. 1.

FIG. 3 is a perspective view of the light bundle of the assembly of FIG. 1.

FIG. 4 is a cross-sectional view taken along line 4—4 of FIG. 2.

FIG. 5 is a cross-sectional view analogous to FIG. 4 except showing a larger number of light guides.

DESCRIPTION OF THE PREFERRED EMBODIMENTS

The fiber optic bundle assembly of the present invention is shown in perspective view in FIG. 1 and indicated generally by reference character 10. The assembly includes the light emitting portion which consists of a focused light source 11 supported on a frame 12. Focused light source 11 is preferably the type which has a dichroic reflector 13 which helps to reduce the amount of ultraviolet light emitted by the focused portion of focused light source 11. A pair of light bundle support members 14 are held on either side of a plate 15. Plate 15 is supported by frame 12. A light bundle 16 is made up of individual light guides 17 which, as shown in FIG. 1, can be seen to be of different lengths. A clamp 18 (shown best in FIG. 2) secures the fiber optic bundle in a tightly packed configuration.

As shown in FIG. 3, each light guide has a light receiving end 19 and a light transmitting end 20. As is also evident in FIGS. 4 and 5, the light receiving ends 19 of each light guide are fixed in the shape of a hexagon and, in fact, are encased in metallic, hexagonal tubes 21. In this way, the tubes can be tightly packed with essentially no space between adjacent tubes. Because of this, it is preferable that there be a number of hexagonal tubes which form a relatively contiguous bundle such as 7 light guides, 19 light guides, 31 or 37 light guides. Each of these shapes can be relatively tightly packed within a circular light bundle support member. Set screws, such as set screws 22, may also be used to hold the clamped bundle within the light bundle support member 14.

Returning to FIGS. 3 and 4, it can be seen that there are only five light guides in the bundle, and two of the light guides have been replaced with solid aluminum plugs 23. In this way, the bundle can continue to be tightly packed even though the bundle does not contain 7, 19, 31 or 37 light guides.

In use, to replace a light guide, clamp 18 is loosened and set screws 22 are unscrewed sufficiently so that the bundle may be released. Then one or more of the light guides may be removed and replaced with a light guide of a different length or by a plug, or a plug may be replaced by a light guide depending on the end use desired.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A fiber optic bundle assembly with removable and replaceable light guides comprising:
   a focused light source held by a frame;
   a light bundle support member supported by said frame; a plurality of light guides held by said light bundle support member, each having a light receiving end and a light transmitting end, said light receiving ends being fixed in the shape of equally sized hexagons, and said light receiving ends being packed together and aligned so that the sides of each hexagon abut at least three sides of adjacent hexagons so that the light receiving ends lie adjacent one another in a single plane and wherein at least one of the light guides is replaced with a hexagonal plug having the same external measurements as the light receiving ends of the light guides and said hexagonal plug having an end incapable of transmitting light.

2. The fiber optic bundle assembly of claim 1 wherein each light receiving end is encased in a rigid hexagonal tube.

3. The fiber optic bundle assembly of claim 1 further including tightenable clamp surrounding said light guides near the light receiving ends thereof.

4. The fiber optic bundle assembly of claim 1 wherein the number of light guides is selected from the group consisting of 7, 19, 31 and 37 light guides.

5. A fiber optic bundle assembly with removable and replaceable light guides comprising:
   a focused light source held by a frame;
   a light bundle support member supported by said frame; and
   a plurality of light guides held by said light bundle support member, each having a light receiving end and a light transmitting end, said light receiving ends being fixed in the shape of equally sized hexagons, and said light receiving ends being packed together and aligned so that the sides of each hexagon abut at least three sides of adjacent hexagons so that the light receiving ends lie adjacent one another in a single plane, said light receiving ends being surrounded by a tightenable clamp so that the clamp may be loosened and one light guide can be removed and replaced with a longer or shorter light guide or by an opaque hexagonal plug.

6. The fiber optic bundle assembly of claim 5 wherein said light bundle support member is a circular light bundle support ring affixed to said frame.

7. The fiber optic bundle assembly of claim 6 further including tightening means to secure the light bundle in said light bundle support ring.

8. The fiber optic bundle assembly of claim 7 wherein each receiving end of each light guide is encased in a rigid hexagonal tube.

9. The fiber optic bundle assembly of claim 8 wherein said rigid hexagonal tube is a metal tube.

10. The fiber optic bundle assembly of claim 5 wherein said focused light source has a dichroic reflector.

* * * * *